(12) United States Patent
Hannon

(10) Patent No.: US 7,358,449 B2
(45) Date of Patent: Apr. 15, 2008

(54) APPARATUS AND METHOD FOR MEASURING LUGGAGE WEIGHT

(76) Inventor: Todd J. Hannon, 5611 381 Avenue, Burlington, WI (US) 53105

( * ) Notice: Subject to any disclaimer, the term of this patent is extended or adjusted under 35 U.S.C. 154(b) by 0 days.

(21) Appl. No.: 11/683,867

(22) Filed: Mar. 8, 2007

(65) Prior Publication Data

US 2007/0209843 A1 Sep. 13, 2007

Related U.S. Application Data

(60) Provisional application No. 60/781,154, filed on Mar. 10, 2006.

(51) Int. Cl.
*G01G 19/58* (2006.01)
*G01G 19/52* (2006.01)
*G04B 47/00* (2006.01)
*G04B 37/00* (2006.01)

(52) U.S. Cl. .................. 177/25.13; 177/131; 177/148; 368/10

(58) Field of Classification Search .................. 368/10; 177/25.13, 131, 148–149
See application file for complete search history.

(56) References Cited

U.S. PATENT DOCUMENTS

| | | | | |
|---|---|---|---|---|
| 5,121,328 | A * | 6/1992 | Sakai et al. ................. | 705/407 |
| 6,608,261 | B2 * | 8/2003 | Thadani ....................... | 177/126 |
| 6,649,849 | B2 * | 11/2003 | Bass et al. ................ | 177/25.15 |
| 7,173,197 | B1 * | 2/2007 | Kasperek ..................... | 177/131 |
| 7,238,895 | B2 * | 7/2007 | Dittrich et al. ............. | 177/126 |
| 7,271,353 | B1 * | 9/2007 | Lewis ......................... | 177/131 |
| 2003/0206495 | A1 * | 11/2003 | Kiboloski et al. | |
| 2005/0217903 | A1 | 10/2005 | Roberts et al. | |
| 2005/0217904 | A1 | 10/2005 | Hughes | |
| 2005/0224261 | A1 | 10/2005 | Marks | |
| 2007/0209843 | A1 * | 9/2007 | Hannon | |

FOREIGN PATENT DOCUMENTS

JP          10-42927 A    *   2/1998

* cited by examiner

*Primary Examiner*—Randy W Gibson
(74) *Attorney, Agent, or Firm*—Cardinal Law Group

(57) ABSTRACT

An apparatus (100) such as a portable weight measuring device for the purpose of simultaneously determining weight and time data includes a container support member (104) having a container engagement portion (102) and a time-determining device (108). A weight-determining device (106) is mounted in the container engagement portion (102). The apparatus can includes data input and out devices, such as an optical connection (406) and a display (110). When a container, such as a piece of luggage, is engaged and lifted by the apparatus, the container weight along with the date and time are output on a display. When container weight exceeds a limit, a warning indicator (112) is activated.

16 Claims, 2 Drawing Sheets

FIG. 1A      FIG. 1B

APPARATUS AND METHOD FOR MEASURING LUGGAGE WEIGHT

CROSS-REFERENCE TO RELATED APPLICATIONS

This application claims the benefit of the U.S. provisional patent application No. 60/781,154 filed on Mar. 10, 2006.

STATEMENT REGARDING FEDERALLY SPONSORED RESEARCH/DEVELOPMENT

The present invention does not involve any form of federally sponsored research or development.

BACKGROUND OF THE INVENTION

The present invention relates to shipping and travel aids such as scales used to measure luggage weight including, but not limited to, integrated weight and time measuring devices.

Increasing regulation of commercial shipping and personal travel, particularly by airplane, require convenient determination of container weight. For travelers, airline rules regarding baggage allowances and related fees can vary drastically from airline to airline and whether travel is domestic or international. Exceeding a luggage weight limit can be very expensive, particularly when a traveler must switch to a smaller regional budget carrier for a leg of their journey. Besides smaller carriers increasingly all carriers have tightened weight restrictions and required additional fees for exceeding weight limits. Some bags may be just too heavy for an airline to accept, so knowing and packing consistent with airline weight regulations before arrival at the airport is important.

Weight measuring devices such as scales and methods for use in determining the weight of containers, such as luggage, suitcases, boxes, briefcases, satchels for carrying electronic devices like computers, and audio and multimedia devices, and sports equipment bags and housings for holding such items as skis, golf clubs, and so forth are known. These devices typically include a weight-measuring element having a load-bearing mechanism for determining weight and a display element. Some load bearing mechanisms such as springs and other mechanical devices have been in use for a very long time. More recently strain gauges, load cells, and so forth are used in connection with electronic type scale devices. Depending on the type of scale, either mechanical or electronic displays are connected to the weight-measuring element. Scales including both the load bearing and display elements can be integrated into the container or piece of luggage. For example, the weight-measuring element can be in the handle or in one or more feet at the container bottom. The display can be mounted on the exterior of the container or luggage so as to be easily viewed. Alternatively, the weight measuring device that are capable of supporting and measuring the weight of the container or luggage can be completely separate from the container or luggage to be weighed.

Besides knowing luggage and container weights, time schedules are an inherent part of modern travel and shipping, particularly by air. For personal and business travel, particularly when faced with multiple time zones, a clock is an important item carried in the luggage of travelers. The clock, a separate device from the scale, includes a timing mechanism and a display. Increasingly, modern travel and shipping can include using two devices: a scale and a clock. For the traveler, this means carrying two devices that each takes up valuable luggage space and weight albeit small in many cases. Unless the devices are built into the container, a further inconvenience is the need to keep track of two devices.

Accordingly, there is a need for an apparatus that measures container weight and time in a single unit having a common display, yet is compact, lightweight, and easy to use.

BRIEF SUMMARY OF THE INVENTION

An apparatus and a method for use to measure container or luggage weight and time are provided. The apparatus includes a first device capable of measuring the weight of a container, a second device capable of determining time, and a display capable of displaying the measured weight and the time. The steps of the method include providing an apparatus capable of determining weight and time, determining container weight, and reporting the measured weight and time.

DESCRIPTION OF THE INVENTION

An apparatus for and method of measuring container weight and determining time are described. The apparatus includes a weight-measuring device such as a strain gauge and a time-determining device such as clock that are connected to a display. The display is capable of receiving both weight and time information and other data and can be formatted to display data in a desired manner. The display can be capable of showing weight and time information simultaneously and sequentially. The apparatus can be a separate external device capable of supporting the weight of the container. Alternatively, the apparatus can be an integral part of the container. For example, the weight-measuring devices can be mounted in the handle, or container feet. Further, the clock can be internally mounted in the container, while the display can be mounted on the handle or on the container exterior.

Figure 1:
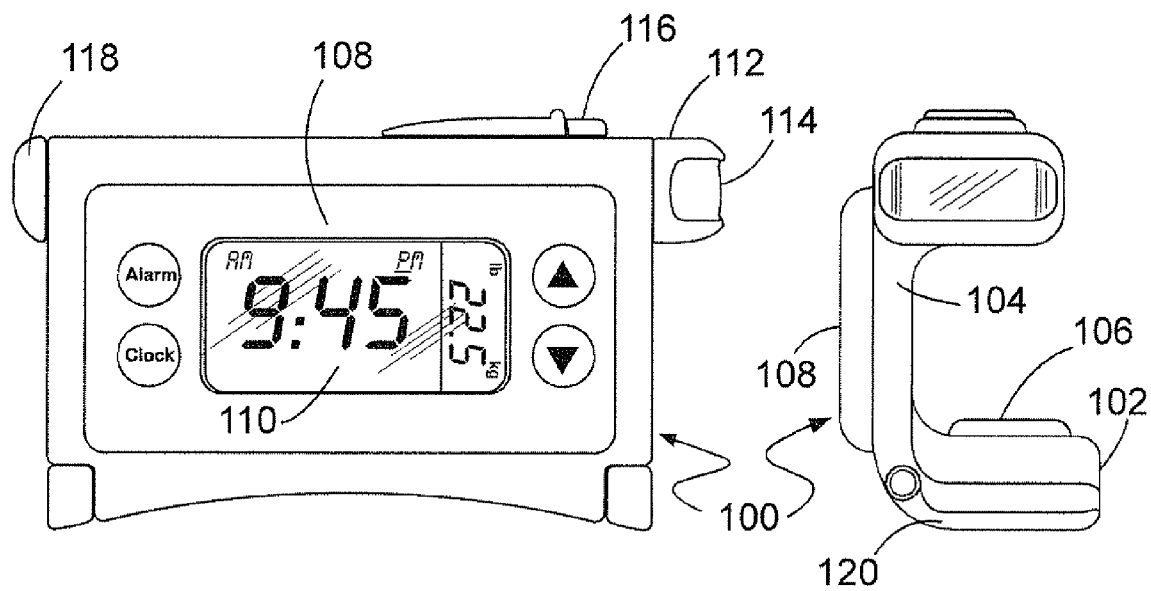
FIG. 1A illustrates the frontal view of an apparatus for measuring container weight and displaying weight and time in accordance with the invention.
FIG. 1B illustrates the side view of an apparatus for measuring container weight and displaying weight and time in accordance with the invention.

An apparatus for measuring container weight and displaying weight and time is shown in FIGS. 1A and 1B. The apparatus 100 includes a container support member 104 having a container engagement portion 102. A weight-measuring device 106 that is capable of receiving and supporting the container is mounted in the container engagement portion 102. The container support member is formed to facilitate the lifting of the apparatus when the container or luggage is located on the weight-measuring device.

A time-determining device 108, such as a clock, is mounted to the container support member 104. Preferably, the time-determining device includes a display 110 that is capable of receiving and simultaneously or sequentially showing weight and time. Alternatively, the time-determining device can be separate from the display. For example, the time-determining device could be an internet clock connected to the apparatus through a wireless connection. In this case, the weight measuring and time-determining devices are each connected to the display such that the display can simultaneously or sequentially show weight and time.

In one embodiment of the invention and when electronic devices are employed, a power source 118 is connected either directly or indirectly to each component: the weight-measuring device, the time-determining device, the display and any other optional components including but not limited to microprocessors, wired and wireless communication devices including optical connection devices, lights, and so forth.

In another embodiment of the invention, the apparatus includes commonly known uses of microprocessors. The microprocessors can either be part of the various devices and components that make up the apparatus or the microprocessors can be separate devices used to connect and control the weight-measuring device, the time-determining device, the display, and other components. Although a preferred time-determining device can be an electronic clock, alternatively, wireless communication devices can be used to receive time and if appropriate weight specification data. In addition, the wireless communication device can also function to communicate container weight and time information. In this use, the apparatus can provide a time stamp with a measured weight that can be wirelessly transmitted from the apparatus.

Optionally, the apparatus can include lights that can be used for illumination and as warning indicators. In one embodiment of the invention, the apparatus includes indicator lights 112 mounted on top of the container support member 104. Colored lights can be used to provide warnings that indicate whether a container or piece of luggage exceeds weight limits. In this case, weight limit data is incorporated into the apparatus, preferably electronically so that in can be updated. Alternatively, weight limit data can be manually input to the apparatus through a keypad or by receipt through a wireless device. Upon comparing weight limits to the weight measured by the weight-measuring device, appropriate warning lights 112 are illuminated such as red if the weight limit is exceeded or green if the weight is acceptable.

In yet another embodiment of the invention, the apparatus includes a flashlight 114 and a switch 116 for operating the flashlight. The switch is positioned so that the flashlight can be used when carrying luggage supported by the apparatus. For example, when carrying luggage down a darkened hallway or into a dark hotel room, the apparatus can provide forward illumination.

Figure 4:
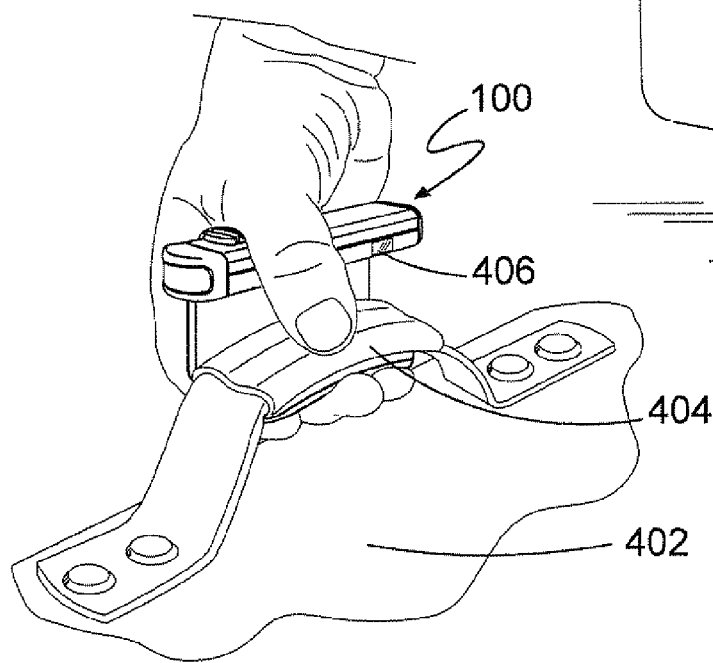
FIG. 4 illustrates an input device of an apparatus for measuring container weight and displaying weight and time engaging a suitcase in accordance with the invention.

When the apparatus in FIGS. 1A and 1B is used to weigh a container, such as luggage, the apparatus is used to support the container in mid-air. As shown in FIG. 4, the apparatus is formed to be grasped when a container or piece of luggage is lifted with the apparatus. To lift and weigh a container or piece of luggage, the container or piece of luggage is placed on the weight-measuring device in the container engagement portion of the container support member. The typical apparatus engagement is by a container handle or other appropriate container member. The container is lifted and supported on the apparatus. When the container is freely supported on the apparatus, the luggage weight can be read on the display or wirelessly transmitted depending on specific apparatus design.

Figure 2:
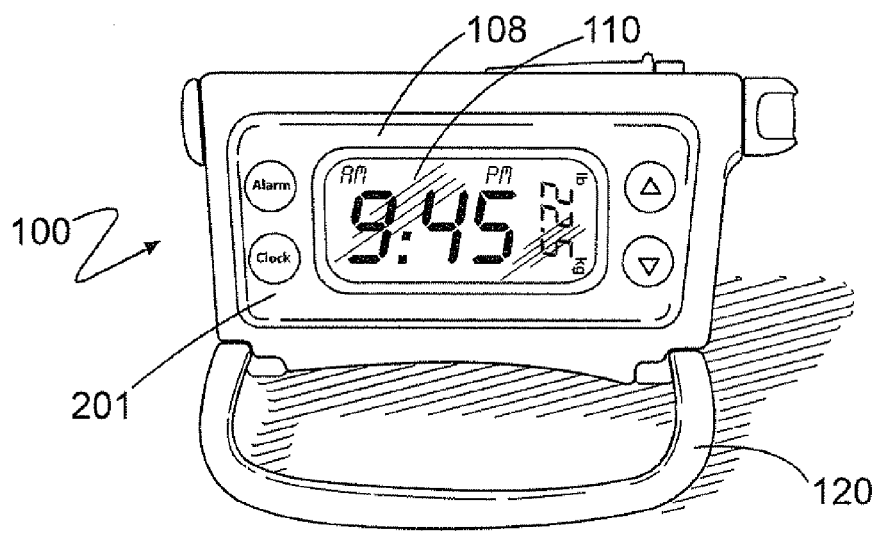
FIG. 2 illustrates displaying time with an apparatus for measuring container weight in accordance with the invention.

The displaying of time with an apparatus for measuring container weight is as shown in FIG. 2. In this embodiment, a stand element 120 is movably attached to the container support member. The stand element can be moved from a stowed position to a deployed position. With the stand element 120 in the stowed position the apparatus can be easily stored in luggage or used to measure luggage weight. In the deployed position, the stand element 120 forms a stand that allows the apparatus to be used as a travel clock. At least one keypad 201 can be provided that allows the various functions of a typical travel alarm clock. In addition to displaying time information, the display 110 can display weight information when the apparatus is used to weigh a container or piece of luggage. Thus, the apparatus can be considered a travel aid that can have two functions: one as a portable luggage scale, and one as a travel clock.

Figure 3:
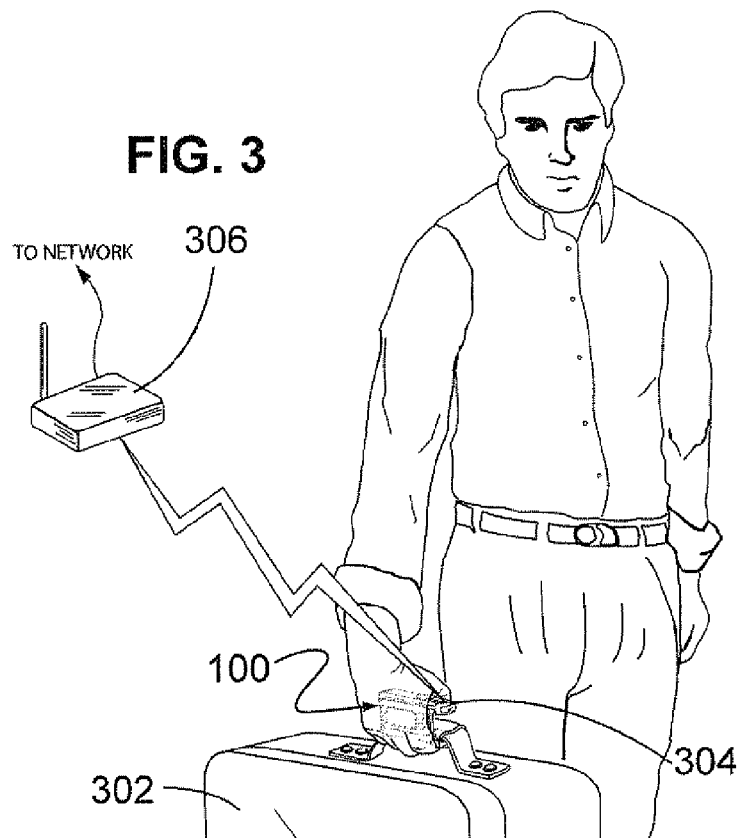
FIG. 3 illustrates the wireless transmission of data from an apparatus for measuring container weight and displaying weight and time in accordance with the invention.

The wireless transmission of data from an apparatus for measuring container weight and displaying weight and time is shown in FIG. 3. The apparatus 100 is used to lift a suitcase 302 having a handle. When the suitcase is lifted and supported solely by the apparatus, a weight of the suitcase is determined and transmitted from a wireless antenna 304 on the apparatus to another wireless receiver 306 that can be further connected to other devices such as through the internet. Preferably, the transmission of weight data is accompanied with date and time information obtained from the time-determining device. Other data can be associated with the container, such as ownership or other identification information. Commonly known input and output devices and microprocessors can be used to measure, record, transmit, and display data including time, date, weight, and a variety of identification information. A security use of the apparatus can include the weighing of container at several points in shipping or travel processes and checking for an unexpected change in container weight indicating possible tampering with the container.

An input device of an apparatus for measuring container weight and displaying weight and time engaging a suitcase is shown in FIG. 4. The apparatus 100 is used to lift a suitcase 402 having a handle 404. In this embodiment, apparatus has an optical connection 406 for inputting data to the apparatus. Either with a container engaged on the apparatus or with a stand-alone apparatus, the apparatus can acquire input data such as container identification via, for example, by reading a bar code with the optical connection 406 mounted on the apparatus 100, or by the use of other devices such as RFID devices and so forth. Remotely available data input through the optical connection 406 can be combined with time and weight information generated by the apparatus. The combined information can be output by a wireless device to an internet connection for tracking purposes. Alternatively, the weight, time, and other information can be displayed on the apparatus display after some nominal delay, for example 20 seconds after the container has been lifted. In the preferred embodiment, the display is not visible during container lifting. Thus, a 20 second delay allows for the container to be disengaged from the apparatus and the weight read on the display.

A method for monitoring container weight includes the steps of providing weight-measuring and time-determining devices in an apparatus, engaging the container on the weight-measuring device of the apparatus, lifting the container with the apparatus, and outputting weight and time information. For the outputting step, the weight-measuring and time-determining devices are connected to a common reporting device such as the display. The providing step applies to either stand-alone apparatuses that are separate from the container, or to apparatuses were the weight-measuring and time-determining devices are part of or are mounted directly to container components such as the container handle and feet.

The step of lifting the container with the apparatus includes positioning the container on the weight-measuring device, and lifting the apparatus so that the container is freely supported. Alternatively, if the weight-measuring device is part of the container handle or foot, the step of lifting the container is by the handle or by lifting the container so that the container rests on weight sensing foot, respectively.

At the reporting step, time and container weight can be reported on a display that is connected to both the time determining and the weight-measuring devices. Alternatively, weight and time can be reported by wirelessly transmission to a desired location.

Although the present invention is illustrated by the example of an apparatus for use with luggage, the present invention may be applied to containers such as suitcases, boxes, briefcases, satchels for carrying electronic devices such as computers, and audio and multimedia devices, and sports equipment bags and housings for holding such items as skis, golf clubs, and so forth.

The present invention provides a number of advantages, including an apparatus that combines a scale and a clock into one compact, lightweight, and easy-to-use apparatus. For shippers and carriers, the providing of simultaneous weight and time information can help to conveniently track container shipments and luggage. The invention can be incorporated directly into containers, or the invention can be advantageously applied in stand-alone units for use with existing containers or where multiple apparatuses installed in a multitude of containers would be less cost effective. When combined with wireless communication capability, a stand-alone unit can further be used to take advantage of decentralized container handling at airports and terminals for security purposes.

The present invention may be embodied in other specific forms without departing from its spirit or essential characteristics. The described embodiments are to be considered in all respects only as illustrative and not restrictive. The scope of the invention is, therefore, indicated by the foregoing description and reasonable equivalents. Changes and variations that come within the meaning and range of equivalency of the description and figures are to be embraced within the scope of this invention.

What is claimed is:

1. An apparatus comprising:
   a container support member including a container engagement portion;
   a weight measuring device mounted in the container engagement portion;
   a programmable alarm clock mounted to the container support member; and
   at least one output device mounted to the container support member and connected to the weight measuring device and the time determining device.

2. The apparatus of claim 1, wherein the at least one output device is selected from a group consisting of a wireless device, an optical device, a display, a data transmission jack, a light, and a data storage device.

3. The apparatus of claim 1, further comprising an electric power source mounted in the container support member, wherein the electric power source electrically connects to the weight measuring device, the programmable alarm clock, and the at least one output device.

4. The apparatus of claim 3, further comprising at least one electrically connected data input device mounted to the container support member.

5. The apparatus of claim 4, wherein the at least one electrically connected input device is selected from a group consisting of a keypad, a wireless device, an optical device, a data transmission jack, and a data storage device.

6. The apparatus of claim 3, further comprising at least one programmable data processing device that is electrically connection to at least one component selected from the group consisting the weight measuring device, the programmable alarm clock, the output device, and the electric power source.

7. The apparatus of claim 6, wherein the programmable data processing device associates time and weight data that are generated at about the same time.

8. The apparatus of claim 6, wherein the programmable data processing device is capable of storing and monitoring data limits.

9. The apparatus of claim 3, further comprising at least one electrically connected illuminating device mounted on the container support member.

10. An apparatus comprising:
    a container support member having a container engagement section;
    a weight measuring device mounted in the container engagement section;
    a programmable alarm clock mounted to the container support member;
    a display supported on the container support member and connected to the weight measuring and the programmable alarm clock;
    at least one output device mounted to the container support member;
    an electric power source in the container support member;
    at least one illuminating device mounted to the container support member; and
    wherein the weight measuring device, the programmable alarm clock, the display, the electric power source, and each illuminating device are electrically connected.

11. The apparatus of claim 10, wherein the least one output device is selected from a group consisting of a wireless device, an optical device, a data transmission jack mounted to the member, and a data storage device.

12. The apparatus of claim 10, further comprising at least one electrically connected input device mounted to the container support member and selected from a group consisting of a keypad, wireless device, an optical device, a data transmission jack, and a data storage device.

13. The apparatus of claim 10, wherein the weight measuring device and the programmable alarm clock are connected to a programmable data processing device mounted in the container support member.

14. The apparatus of claim 13, wherein the programmable data processing device associates time and weight data that are generated at about the same time.

15. The apparatus of claim 13, wherein the programmable data processing device stores and monitors data limits.

16. The apparatus of claim 11, wherein the programmable alarm clock includes a keypad, and the display, and has a deployable stand element attached to the container support member.

* * * * *